US008182006B2

(12) United States Patent
Liu et al.

(10) Patent No.: US 8,182,006 B2
(45) Date of Patent: May 22, 2012

(54) CYLINDER LOCK HAVING A REINFORCEMENT STRUCTURE COUPLED TO AN OUTER ROSE DISC

(75) Inventors: Cheng-Chung Liu, Chiayi County (TW); Lan-Kun Don, Chiayi (TW)

(73) Assignee: Tong Lung Metal Industry Co., Ltd., Chia-Yi (TW)

( * ) Notice: Subject to any disclaimer, the term of this patent is extended or adjusted under 35 U.S.C. 154(b) by 452 days.

(21) Appl. No.: 12/468,235

(22) Filed: May 19, 2009

(65) Prior Publication Data

US 2009/0288459 A1 Nov. 26, 2009

(30) Foreign Application Priority Data

May 21, 2008 (TW) ................................ 97208889 U

(51) Int. Cl.
*E05B 1/00* (2006.01)
*B60R 25/02* (2006.01)

(52) U.S. Cl. ........... 292/347; 292/348; 292/357; 70/224

(58) Field of Classification Search .................. 292/347, 292/348, 357; 70/224
See application file for complete search history.

(56) References Cited

U.S. PATENT DOCUMENTS

| | | | | |
|---|---|---|---|---|
| 1,462,827 | A * | 7/1923 | Rixson | 292/348 |
| 2,805,880 | A * | 9/1957 | Brozek et al. | 292/357 |
| 3,228,218 | A * | 1/1966 | Wilson | 70/475 |
| 3,716,261 | A * | 2/1973 | Gerlach | 292/169.23 |
| 5,157,952 | A * | 10/1992 | Lin | 70/216 |
| 5,284,372 | A * | 2/1994 | Lin | 292/336.3 |
| 6,099,053 | A * | 8/2000 | Huang | 292/336.3 |
| 6,216,500 | B1 * | 4/2001 | Kang | 70/224 |
| 6,360,569 | B1 * | 3/2002 | Huang | 70/215 |
| 6,993,945 | B1 * | 2/2006 | Chen | 70/472 |
| 7,066,507 | B2 * | 6/2006 | Don | 292/336.3 |
| 7,347,462 | B2 * | 3/2008 | Ellis et al. | 292/348 |
| 2005/0046203 | A1 * | 3/2005 | Huang | 292/348 |

* cited by examiner

*Primary Examiner* — Carlos Lugo
(74) *Attorney, Agent, or Firm* — Ladas & Parry LLP

(57) ABSTRACT

A cylinder lock includes an outer rose disc having a middle opening, two locking holes, and an annular lateral rim formed with opposite engagement elements, a reinforcement structure having a first plate section that has a central hole aligned with the middle opening, and two passage holes aligned with the respective locking holes, two second plate sections extending transversely from two opposite ends of the first plate section, and two support sections respectively extending from the second plate sections to the lateral rim to engage the engagement elements. An outer drive tube extends through the middle opening and central hole. The reinforcement structure provides enhanced stiffness and robustness to two securing rods extending through the locking holes and the passage holes.

16 Claims, 6 Drawing Sheets

CYLINDER LOCK HAVING A REINFORCEMENT STRUCTURE COUPLED TO AN OUTER ROSE DISC

CROSS-REFERENCE TO RELATED APPLICATION

This application claims priority of Taiwanese Utility Model Application No. 097208889 filed on May 21, 2008.

BACKGROUND OF THE INVENTION

1. Field of the Invention

This application relates to a cylinder lock, more particularly to a cylinder lock having a reinforcement structure coupled to an outer rose disc.

2. Description of the Related Art

Referring to FIG. 1, a conventional cylinder lock includes outer and inner handle assemblies 1A, 2, and a latch assembly 3. The outer handle assembly 1A includes an outer rose assembly 11A, an outer handle 12A, an outer drive unit 13A hating a transmission tube 15A, and a pair of tubular securing rods 14A having internal screw threads. The inner handle assembly 2 includes an inner rose assembly 21, an inner handle 22 and an inner drive unit (not shown). Two screw holes 25 are provided in the inner rose assembly 21.

In assembly, the latch assembly 3 is inserted into a hole 42 in a door panel 4 and is fixed to the door panel 4 using two screws 31. The outer drive assembly 13A and the inner drive assembly (not shown) are inserted partially into another hole 41 in the door panel 4. The tubular securing rods 14A and the transmission tube 15A are inserted respectively into holes 32 and 33 of the latch assembly 3. Thereafter, the inner drive unit of the inner handle assembly 2 with a transmission tube hole is sleeved onto the transmission tube 15A, and two screws 24 are passed through the respective screw holes 25 and engaged with the respective internal screw threads of the tubular securing rods 14A, thereby securing the outer and inner handle assemblies 1A and 2 to the door panel 4.

However, since the cross-sectional dimension of the tubular securing rods 14A is limited by the size of the holes 32, the robustness of the tubular securing rods 14A is insufficient, and the cylinder lock can be easily destroyed by hammering and twisting the outer handle assembly 1A.

SUMMARY OF THE INVENTION

An object of the invention is to provide a cylinder lock with a reinforcement structure which provides enhanced stiffness and robustness to the cylinder lock.

According to one aspect of the present invention, a cylinder lock comprises: an outer rose disc including a main disc portion that has an inner periphery defining a middle opening, two locking holes disposed respectively on two sides of the middle opening, and a lateral rim that extends annularly and axially from an outer periphery of the main disc portion and that has engagement elements which are opposite to each other; a reinforcement structure including a first plate section that is opposite to said main disc portion and that has a central hole aligned with the middle opening, and two passage holes respectively aligned with the locking holes, two second plate sections extending transversely and respectively from two opposite ends of the first plate section towards said main disc portion, and two support sections respectively extending from the second plate sections to the lateral rim and engaging the engagement elements; a latch mechanism having two connecting holes, and a latch adapted to extend retractably into a latch hole provided in a door frame; two securing rods each extending through one of the locking holes, one of the passage holes and one of the connecting holes; an outer drive tube extending through the middle opening and the central hole; and an outer handle connected to the outer drive tube.

According to another aspect of the present invention, a cylinder lock comprises: an outer rose disc including a main disc portion that has an inner periphery defining a middle opening, two locking holes disposed respectively on two sides of the middle opening, and a lateral rim that extends annularly and axially from an outer periphery of the main disc portion; a reinforcement structure including a first plate section that is opposite to the main disc portion and that has a central hole aligned with the middle opening, and two passage holes respectively aligned with the locking holes, two second plate sections extending transversely and respectively from two opposite ends of the first plate section toward the main disc portion, two third plate portions extending transversely and respectively from the second plate sections to the lateral rim, and two fourth plate portions extending transversely and respectively from the third plate portions and having outer surfaces abutting against an inner surface of the lateral rim; two securing rods each extending through one of the locking holes, and one of the passage holes; an outer drive tube extending through the middle opening and the central hole; and an outer handle connected to the outer drive tube.

According to further aspect of the present invention, a cylinder lock comprises; an outer rose disc including a main disc portion that has an inner periphery defining a middle opening, two locking holes disposed respectively on two sides of the middle opening, and a lateral rim that extends annularly and axially from an outer periphery of the main disc portion; a reinforcement structure including a first plate section that is opposite to the main disc portion and that has a central hole aligned with the middle opening, an annular flange extending axially from the first plate section around the central hole, and two passage holes respectively aligned with the locking holes, two second plate sections extending transversely and respectively from two opposite ends of the first plate section toward the main disc portion, two third plate portions extending transversely and respectively from the second plate sections to the lateral rim, and two fourth plate portions extending transversely and respectively from the third plate portions and having outer surfaces abutting against an inner surface of the lateral rim; two securing rods each extending through one of the locking holes, and one of the passage holes; and an outer drive tube extending through the middle opening and the central hole and abutting against the annular flange.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
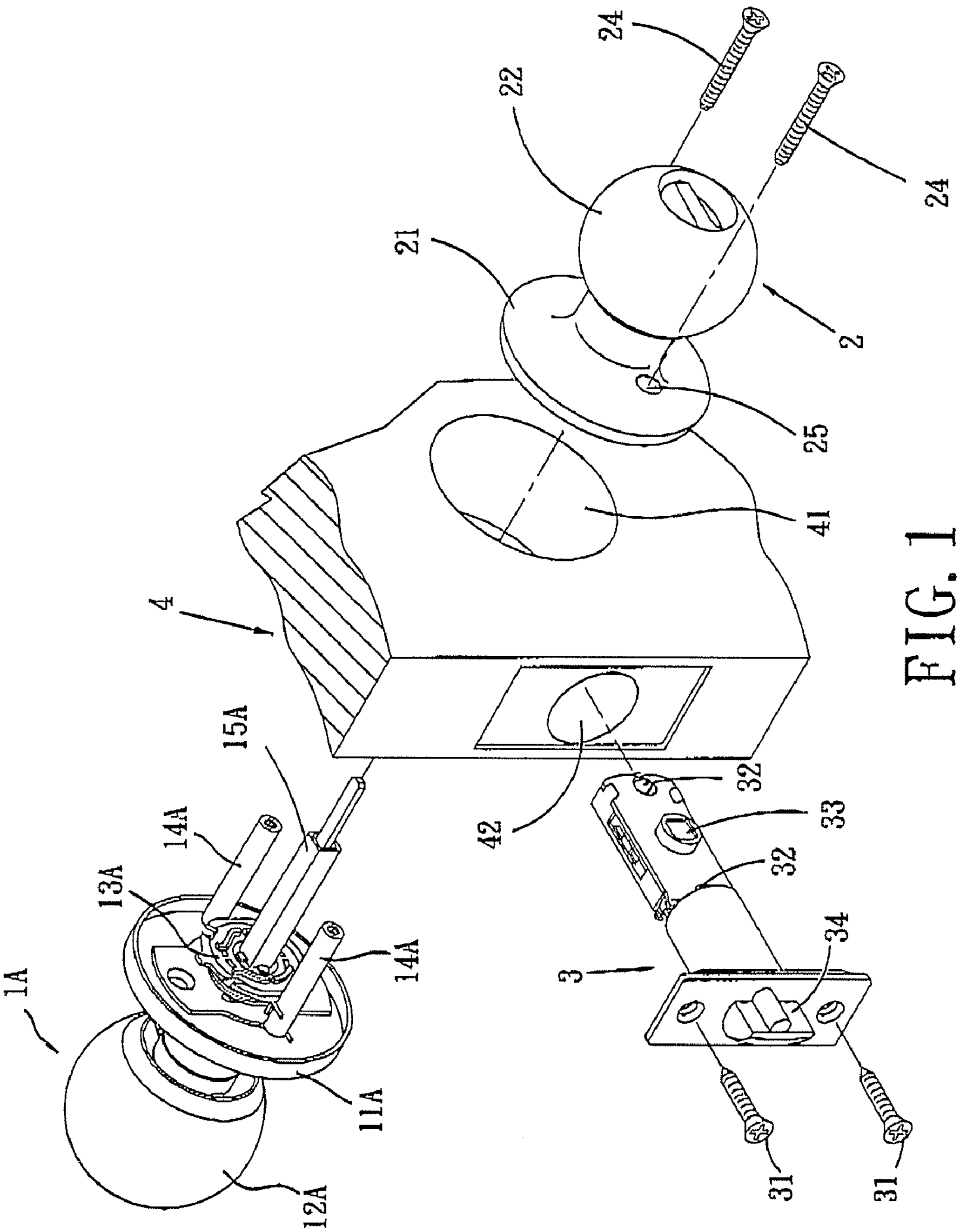
FIG. 1 PRIOR ART
FIG. 1 shows a cylinder lock in the prior art.

Before the present invention is described in greater detail, it should be noted that same reference numerals have been used to denote like elements throughout the specification.

Figure 2:
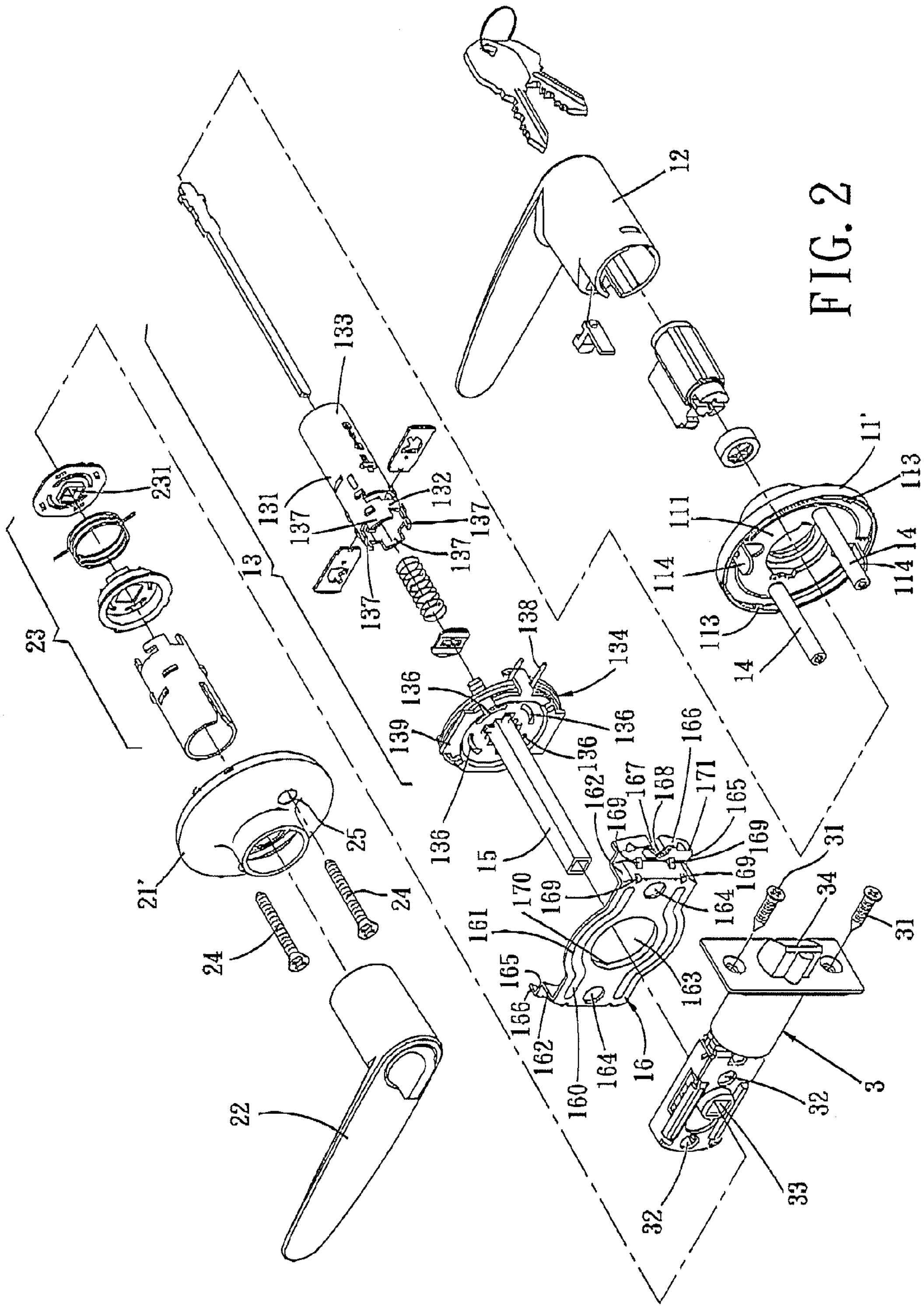
FIG. 2 is an exploded view of a cylinder lock according to a preferred embodiment of the present invention.
Figure 3:
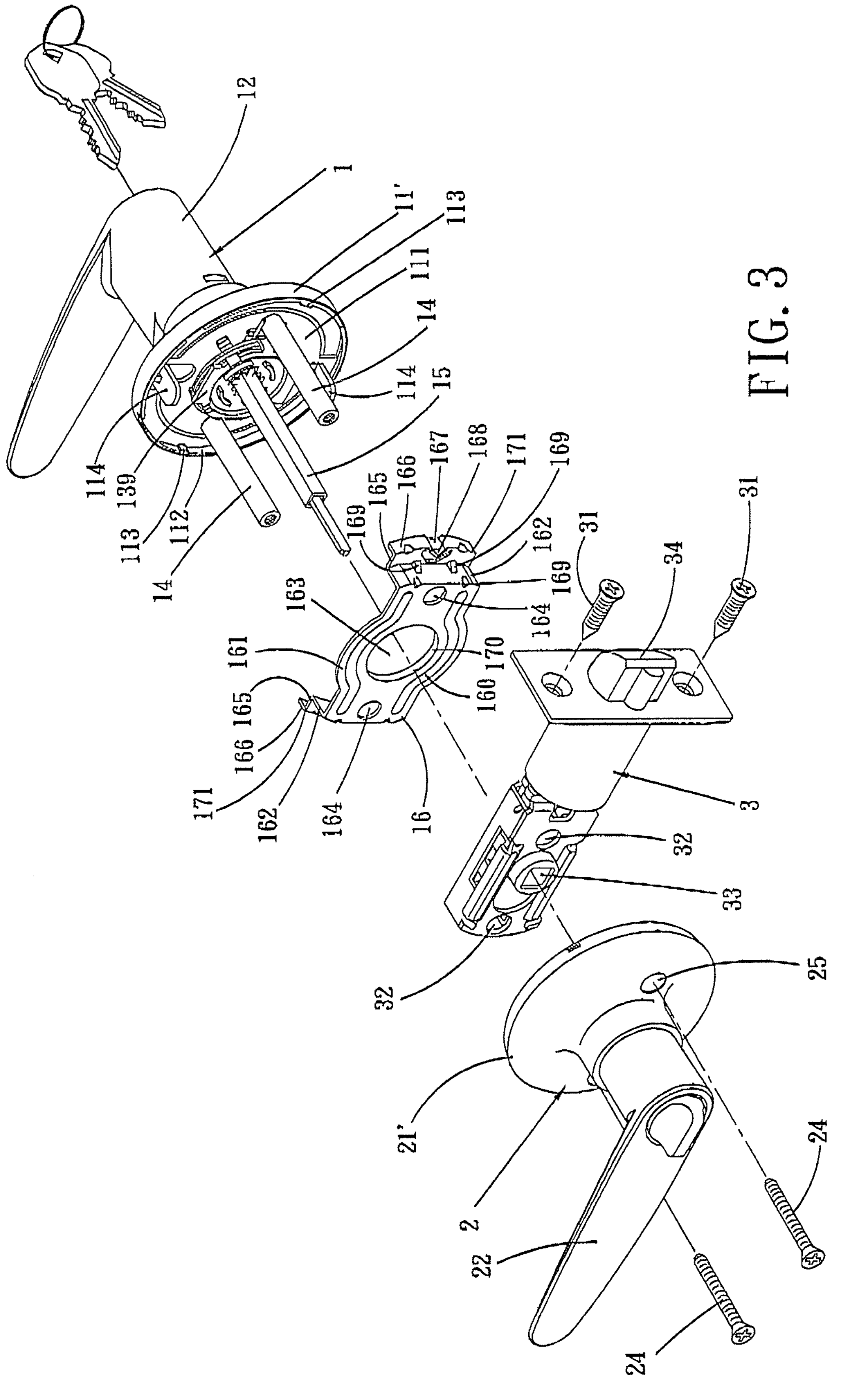
FIG. 3 is a partially exploded view of the cylinder lock of FIG. 2.
Figure 4:
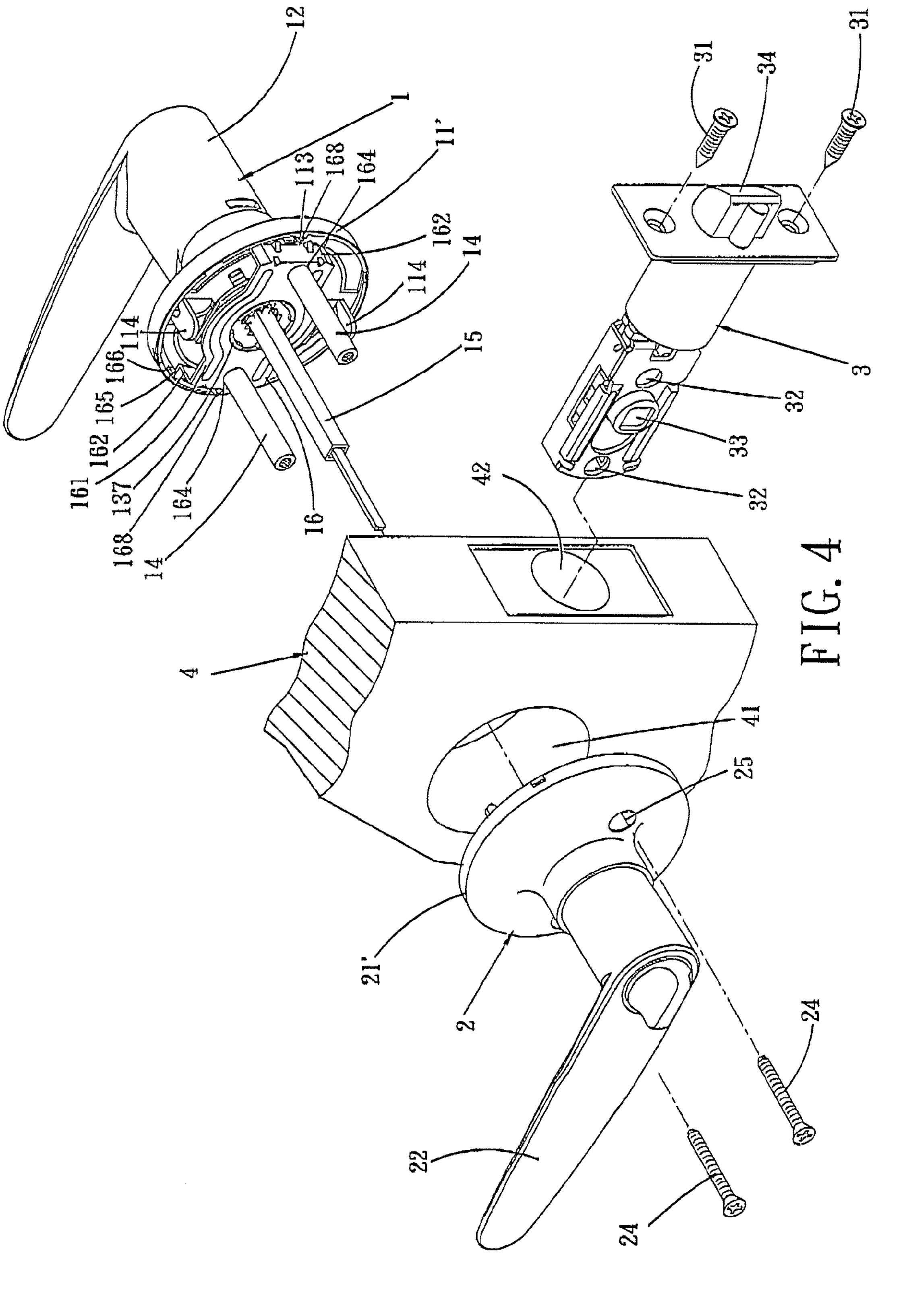
FIG. 4 shows the cylinder lock that is to be mounted on a door panel.
Figure 5:
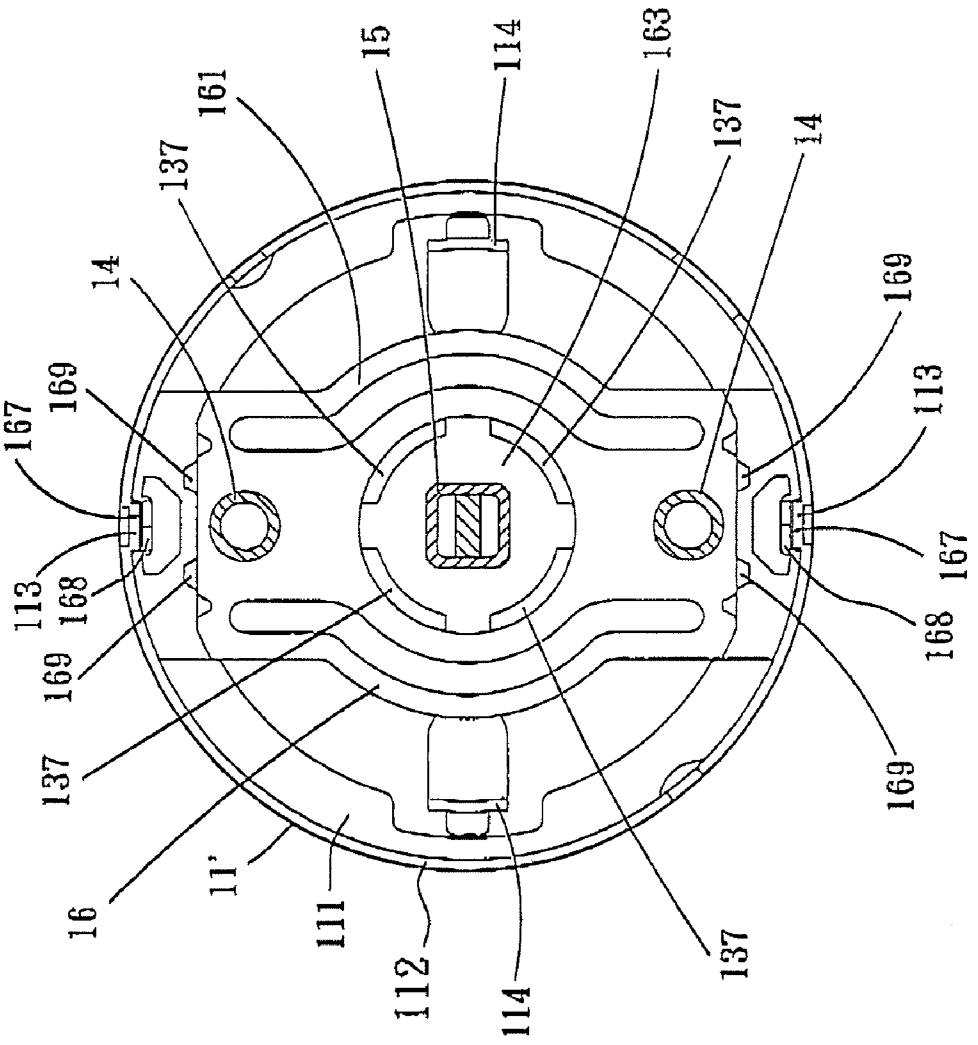
FIG. 5 is a fragmentary sectional view of the cylinder lock.
Figure 6:
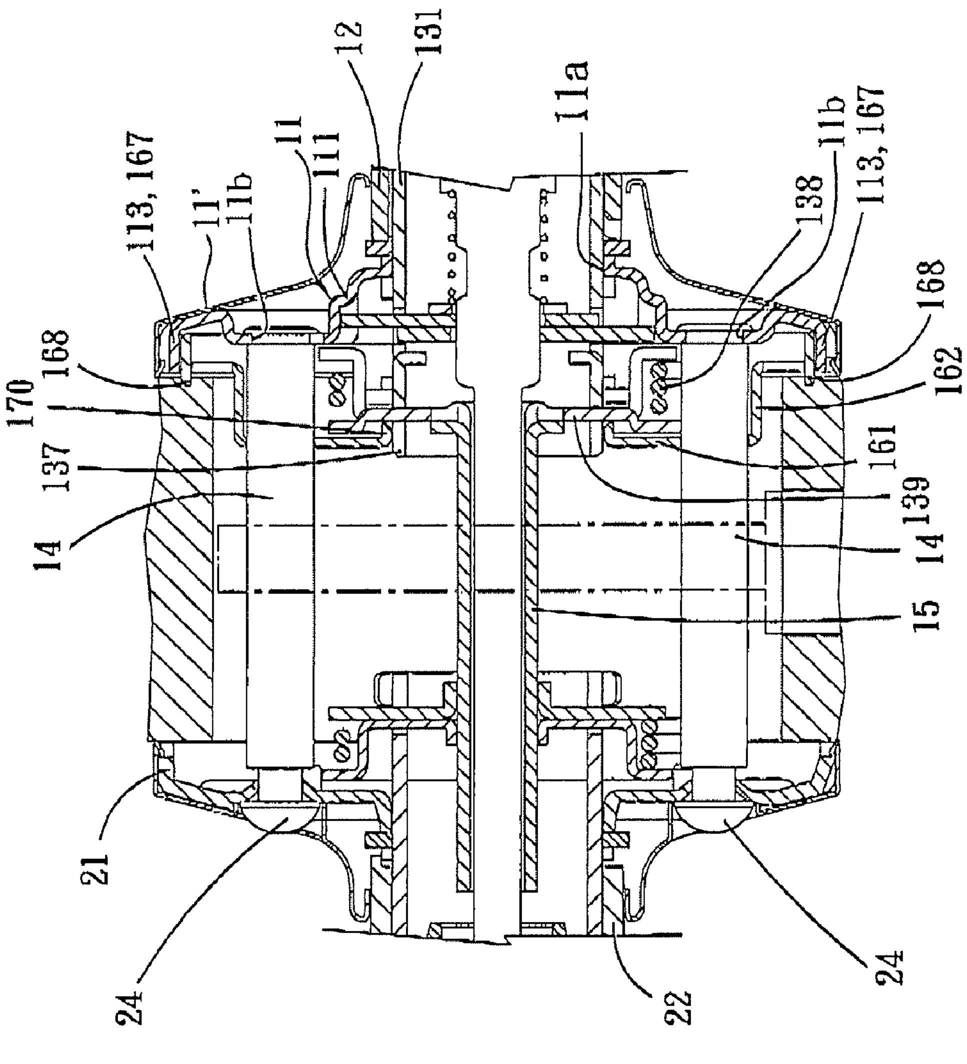
FIG. 6 is another fragmentary sectional view of the cylinder lock.

Referring to FIGS. 2 to 6, a cylinder lock according to a preferred embodiment of the present invention is shown to include an outer handle assembly 1, an inner handle assembly 2, and a latch mechanism 3. The outer handle assembly 1 includes an outer rose disc 11 (FIG. 6) covered by an outer rose cap 11', an outer handle 12, an outer drive mechanism 13, and a reinforcement structure 16. The inner handle assembly 2 includes an inner rose disc 21 (FIG. 6) covered by a rose cap 21', an inner handle 22, and an inner drive mechanism 23. The inner rose disc 21 has two screw holes 25. The latch mechanism 3 has two connecting holes 32, a transmission tube hole 33 and a latch 34 adapted to extend retractably into a latch hole (not shown) formed in a door frame (not shown).

The outer rose disc 11 includes a main disc portion 111 that has an inner periphery defining a middle opening 11*a*, an annular flange extending axially from the main disc portion 111 around the middle opening 11*a*, two diametrically opposite locking holes 11*b* disposed on two opposite sides of the middle opening 11*a*, and a lateral rim 112 that extends annularly and axially from an outer periphery of the main disc portion 111 and that has engagement elements 113 which are opposite to each other substantially in a diametral direction. The engagement elements 113 project inwardly and radially from an inner surface of the lateral rim 112. Two angularly spaced apart bent tabs 114 project axially from the main disc portion 111 at two diametrically opposite positions and in proximity to the lateral rim 112. Preferably, the bent tabs 114 are formed by cutting and bending parts of the main disc portion 111.

The outer drive mechanism 13 has an outer drive tube 131, and a torsional returning unit 134. The outer drive tube 131 has first and second parts 132 and 133. The first part 132 has four tabs 137 that project axially at one end of the outer drive tube 131. The second part 133 is inserted into the middle opening 11*a* of the outer rose disc 11 and the outer handle 12 and is connected to the outer handle 12.

The torsional returning unit 134 is disposed within the outer rose disc 11 and has a torsion spring 138 for returning the outer drive tube 131 after the outer drive tube 131 is rotated by rotating the outer handle 12, and a spring retainer 139 retaining the torsion spring 138 and disposed between the main disc portion 111 and a first plate portion 161 of the reinforcement structure 16. The spring retainer 139 has four angularly spaced apart apertures 136 for extension of the tabs 137 of the outer drive tube 13, and a centrally and axially projecting transmission tube 15.

The reinforcement structure 16 is disposed oppositely of the main disc portion 111 of the outer rose disc 11, and includes the first plate section 161 that is opposite to the main disc portion 111 and that has a central hole 163 aligned with the middle opening 11*a* of the outer rose disc 11, an annular flange 170 projecting axially from the first plate section 161 around the central hole 163, two passage holes 164 respectively aligned with the locking holes 11*b*, and two reinforcing ribs 160 which are disposed respectively on two opposite sides of the central hole 163 and each of which has two opposite ends respectively extending to two opposite ends of the first plate section 161.

The reinforcement structure 16 further includes two second plate sections 162 extending transversely and respectively from two opposite ends of the first plate section 161 towards the main disc portion 111, and two support sections 171 respectively extending from the second plate sections 162 to the lateral rim 112 and engaging the engagement elements 113.

Each support section 171 is constituted of a third plate portion 165 and a fourth plate portion 166. Each third plate portion 165 extends transversely and outwardly from the respective second plate portion 162 to the lateral rim 112, and has a nose element 168 projecting from the third plate portion 165 in a direction away from the main disc portion 111. Preferably, the nose element 168 is formed by pressing and bending a part of the respective third plate portion 165. Each fourth plate portion 166 extends transversely from one end of the respective third plate portion 165, and having an outer surface abutting against the inner surface of the lateral rim 112.

Each fourth plate portion 166 has the outer surface thereof provided with a recess 167 to engage the respective engagement element 113 which is in the form of a protrusion. The engagement elements or protrusions 113 project inwardly from the lateral rim 112 and are inserted into the respective recesses 167 of the fourth plate portions 166. While the engagement elements 113 are the protrusions and the fourth plate portions 166 have the recesses 167 for interengagement of the lateral rim 112 and the reinforcement structure 16, the engagement elements 113 may be in the form of a recess and the fourth plate portions 166 may be provided with protrusions.

In assembly, the securing rods 14 are respectively fixed in the locking holes 11*b* of the outer rose disc 11. The outer drive tube 131 is assembled with the torsional returning unit 134 so that the tabs 137 of the outer drive tube 131 are passed through the respective apertures 136 of the spring retainer 139. The outer drive tube 131 is inserted into the middle opening 11*a* of the outer rose disc and the outer handle 12. The reinforcement structure 16 is disposed over the spring retainer 139 in such a manner that the central hole 163 thereof receives the tabs 137 of the outer drive tube 131 and that the passage holes 164 thereof receive the respective securing rods 14. The fourth plate portions 166 are pressed into the lateral rim 112 so that the protrusions 113 extend into the respective recesses 167, thereby placing the reinforcement structure 16 in engagement with the outer rose disc 11. The tabs 137 passing through the apertures 136 have the outer surfaces thereof abutting against the annular flange 170. As a result, the reinforcement structure 16 is firmly coupled to the outer rose disc 11, thereby strengthening the reinforcement structure 16. In addition, in order to further strengthen the reinforcement structure 16, reinforcing ribs 169 are provided at corners formed between the first and second plate sections 161, 162, between the second plate sections 162 and the third plate portions 165, and between the third and fourth plate portions 165, 166. Bach reinforcing rib 169 extends across and is indented from an edge of the respective corner.

To install the cylinder lock on the door panel 4, the latch mechanism 3 is inserted into a mounting hole 42 in a door panel 4 and is secured to the door panel 4 using screws 31. The outer handle assembly 1 assembled as described above is inserted partially into another hole 41 of the door panel 4, the securing rods 14 are inserted respectively into the connecting holes 32 in the latch mechanism 3, and the transmission tube 15 is inserted into the transmission tube hole 33 in the latch mechanism 3. The bent tabs 114 are inserted 15 into the hole 41 of the door panel 4 and can be optionally bent such that the bent tabs 114 abut against a wall confining the hole 41 or a surface of the door panel 4. Afterward, the inner handle assembly 2 is inserted partially into the hole 41 from an inside of the door panel 4 until the transmission tube 15 of the outer handle assembly 1 extends into a hole 231 (FIG. 2) of the inner drive mechanism 23. When two screws 24 are respectively passed through the holes 25 in the inner rose cap 21' and the inner rose disc 21 and engaged with internal screw threads of the securing rods 14, the inner and outer handle assemblies 2, 1 are secured to the door panel 4 and the latch mechanism 3. In this situation, the nose elements 168 on the third plate portions 165 can engage or abut against a surface of the door panel 4.

The use of the reinforcement structure 16 can increase the stiffness and robustness of the securing rods 14 and the stability of the outer drive tube 131 during rotation. In addition, the bent tabs 114 and the nose elements 168 can enhance the engagement of the cylinder lock with the door panel 4. Accordingly, the cylinder lock is provided with enhanced mechanical strength to resist substantial destructive torsional forces.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

We claim:

1. A cylinder lock comprising:

an outer rose disc including a main disc portion that has an inner periphery defining a middle opening, and a lateral rim that extends annularly and axially from an outer periphery of said main disc portion and that has protrusions which are opposite to each other;

a reinforcement structure including a first plate section that is opposite to said main disc portion and that has a central hole aligned with said middle opening, and two passage holes respectively disposed on two sides of said central hole, two second plate sections extending transversely and respectively from two opposite ends of said first plate section towards said main disc portion, and two support sections respectively extending from said second plate sections to said lateral rim and engaging said protrusions;

a latch mechanism having two connecting holes, and a latch adapted to extend retractably into a latch hole;

an inner rose disc having two screw holes;

two securing rods each connected to said outer rose disc and extending through one of said passage holes, and one of said connecting holes;

two screws respectively passing through said screw holes and engaged with internal screw threads of said securing rods;

an outer drive tube extending through said middle opening and said central hole; and an outer handle connected to said outer drive tube;

wherein each of said support sections has a third plate portion extending transversely and outwardly from one of said second plate portions to said lateral rim, and a fourth plate portion extending transversely from said third plate portion and having an outer surface abutting against an inner surface of said lateral rim, said outer surface having a recess, said protrusions projecting inwardly from said inner surface of said lateral rim and being inserted respectively into said recesses formed in said outer surfaces of said fourth plate portions of said support sections.

2. The cylinder lock of claim 1, wherein each of said support sections further has a nose element projecting from said third plate portion in a direction away from said main disc portion and adapted to engage the door panel.

3. The cylinder lock of claim 1, wherein said first plate section further has an annular flange extending axially from said first plate section around said central hole, said annular flange abutting against said outer drive tube.

4. The cylinder lock of claim 3, further comprising a torsion spring disposed within said outer rose disc for returning said outer drive tube after said outer drive tube is rotated through said outer handle; and a spring retainer retaining said torsion spring and disposed between said main disc portion and said first plate section.

5. The cylinder lock of claim 4, wherein said outer drive tube has a plurality of tabs projecting axially from one end of said outer drive tube and extending through said spring retainer and into said central hole, said annular flange abutting against outer surfaces of said tabs of said outer drive tube.

6. The cylinder lock of claim 1, wherein said outer rose disc further includes angularly spaced apart bent tabs projecting axially and inwardly from said main disc portion in proximity to said lateral rim and adapted to extend into a hole in a door panel.

7. The cylinder lock of claim 1, wherein each of said second plate sections forms a corner with said first plate section, and said reinforcement structure further has a reinforcing rib that extends across and is indented from an edge of said corner.

8. The cylinder lock of claim 1, wherein each of said second plate sections forms a corner with one of said third plate sections, and said reinforcement structure further has a reinforcing rib that extends across and is indented from an edge of said corner.

9. The cylinder lock of claim 1, wherein said first plate section has two reinforcing ribs which are respectively disposed on two opposite sides of said central hole and each of which has two opposite ends respectively extending to said two opposite ends of said first plate section.

10. A cylinder lock comprising:

an outer rose disc including a main disc portion that has an inner periphery defining a middle opening, and a lateral rim that extends annularly and axially from an outer periphery of said main disc portion;

a reinforcement structure including a first plate section that is opposite to said main disc portion and that has a central hole aligned with said middle opening, and two passage holes disposed respectively on two sides said central hole, two second plate sections extending transversely and respectively from two opposite ends of said first plate section toward said main disc portion, two third plate portions extending transversely and respectively from said second plate sections to said lateral rim, and two fourth plate portions extending transversely and respectively from said third plate portions and having outer surfaces abutting against an inner surface of said lateral rim;

a latch mechanism having two connecting holes, a transmission tube hole disposed between said connecting holes, and a latch adapted to extend retractably into a latch hole;

an inner rose disc;

two securing rods each connected to said outer and inner rose discs and extending through one of said passage holes and one of said connecting holes;

an outer drive tube extending through said middle opening and said central hole; and an outer handle connected to said outer drive tube.

11. The cylinder lock of claim 10, further comprising:

a torsion spring disposed within said outer rose disc for returning said outer drive tube after said outer drive tube is rotated through said outer handle;

a spring retainer retaining said torsion spring and disposed between said main disc portion and said first plate section; and a transmission tube projecting centrally and axially from said spring retainer and extending through said central hole and said transmission tube hole in said latch mechanism.

12. The cylinder lock of claim 10, wherein each of said third plate portions has a nose element projecting therefrom in a direction away from said main disc portion.

13. The cylinder lock of claim 10, wherein said outer surface of each of said fourth plate portions has a recess, and said lateral rim has two angularly spaced apart protrusions respectively engaging said recesses of said fourth plate portions.

14. The cylinder lock of claim 10, wherein said outer rose disc further has two angularly spaced bent tabs projecting axially and inwardly from said main disc portion in proximity of said lateral rim and adapted to extend into a hole in a door panel.

15. A cylinder lock comprising:

an outer rose disc including a main disc portion that has an inner periphery defining a middle opening, and a lateral rim that extends annularly and axially from an outer periphery of said main disc portion;

a reinforcement structure including a first plate section that is opposite to said main disc portion and that has a central hole aligned with said middle opening, an annular flange extending axially from said first plate section around said central hole, and two passage holes respectively disposed on two sides of said central hole, two second plate sections extending transversely and respectively from two opposite ends of said first plate section toward said main disc portion, two third plate portions extending transversely and respectively from said second plate sections towards said lateral rim, and two fourth plate portions extending transversely and respectively from said third plate portions and having outer surfaces abutting against an inner surface of said lateral rim;

a latch mechanism having two connecting holes, and a latch adapted to extend retractably into a latch hole;

an inner rose disc;

two securing rods each connected to said outer and inner rose discs and extending through one of said passage holes and one of said connecting holes; and an outer drive tube extending through said middle opening and said central hole and abutting against said annular flange.

16. The cylinder lock as claimed in claim 15, wherein at least one of said fourth plate portions has a recess, and said lateral rim has a protrusion engaging said recess.

* * * * *